(12) United States Patent
Thangavelu et al.

(10) Patent No.: US 12,008,130 B1
(45) Date of Patent: Jun. 11, 2024

(54) SECURE DATA ACCESS MANAGEMENT SYSTEM

(71) Applicant: Amazon Technologies, Inc., Seattle, WA (US)

(72) Inventors: Ganesh Vel Thangavelu, Vancouver (CA); Sandeep Kumar Lakshmichand Jain, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 347 days.

(21) Appl. No.: 17/491,188

(22) Filed: Sep. 30, 2021

(51) Int. Cl.
*G06F 21/62* (2013.01)
*G06F 16/16* (2019.01)
*G06F 21/60* (2013.01)

(52) U.S. Cl.
CPC ........ *G06F 21/6227* (2013.01); *G06F 16/164* (2019.01); *G06F 21/604* (2013.01); *G06F 2221/2113* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 6,516,315 B1 * | 2/2003 | Gupta | ................ | G06F 21/6218 707/999.009 |
| 7,827,195 B2 * | 11/2010 | Uematsu | ............... | G06F 40/295 707/784 |
| 7,840,551 B2 * | 11/2010 | Wong | .................. | G06F 21/6227 707/758 |
| 8,166,071 B1 * | 4/2012 | Korablev | .............. | G06F 21/604 707/783 |
| 8,327,419 B1 * | 12/2012 | Korablev | .............. | H04L 63/105 726/19 |
| 8,423,550 B2 * | 4/2013 | Kimura | ............... | G06F 21/6218 707/791 |
| 8,463,815 B1 * | 6/2013 | Zoellner | ................. | G06F 16/14 707/999.009 |
| 8,996,574 B2 * | 3/2015 | Wu | ..................... | G06F 21/6209 707/805 |
| 9,665,733 B1 * | 5/2017 | Sills | .................... | G06F 21/6218 |
| 10,146,955 B2 * | 12/2018 | Fuchs | ................. | G06F 21/6236 |
| 10,482,269 B1 * | 11/2019 | Carroll | .................... | G06F 21/62 |
| 10,503,920 B2 * | 12/2019 | Panchbudhe | ....... | G06F 21/6245 |
| 10,824,751 B1 * | 11/2020 | Kurian | .................. | G06F 16/282 |
| 10,826,844 B2 * | 11/2020 | Summers | .............. | H04L 47/808 |
| 10,891,391 B2 * | 1/2021 | Gordon | .................. | H04L 9/088 |
| 11,227,069 B2 * | 1/2022 | Hay | ...................... | H04L 63/102 |

(Continued)

*Primary Examiner* — Backhean Tiv
(74) *Attorney, Agent, or Firm* — Knobbe, Martens, Olson & Bear, LLP

(57) ABSTRACT

Systems and methods are provided for management of access to data by maintaining the lineage of access metadata as data is queried, processed, and stored in a computing environment. Data stored within a computing environment may be tagged or otherwise associated with metadata representing an access categorization of the data. When the data is used to create new data sets, the access categorizations of the base data are retained, and metadata representing an access categorization of the created data sets is generated based on the access categorizations of the base data. The created data may be stored in a location according to the access categorization.

20 Claims, 9 Drawing Sheets

(56) References Cited

U.S. PATENT DOCUMENTS

| | | | |
|---|---|---|---|
| 11,258,798 B2* | 2/2022 | Hugot | H04L 9/32 |
| 11,288,395 B2* | 3/2022 | Landman | G06F 16/258 |
| 11,580,037 B2* | 2/2023 | Kraus | G06F 21/604 |
| 11,748,382 B2* | 9/2023 | Saillet | G06N 7/01 |
| | | | 707/737 |
| 11,797,701 B1* | 10/2023 | Angelo | G06F 16/2477 |
| 2005/0172149 A1* | 8/2005 | Xu | G06F 21/6218 |
| | | | 709/225 |
| 2010/0114966 A1* | 5/2010 | Smith | G06F 21/6218 |
| | | | 707/E17.005 |
| 2017/0250885 A1* | 8/2017 | Donovan | H04L 43/16 |
| 2019/0052639 A1* | 2/2019 | Reddy | G06F 21/6218 |
| 2020/0341997 A1* | 10/2020 | Spitz | G06F 16/2282 |
| 2023/0409444 A1* | 12/2023 | Chen | G06F 11/1469 |

\* cited by examiner

SECURE DATA ACCESS MANAGEMENT SYSTEM

BACKGROUND

Computing devices can utilize communication networks to exchange data. Companies and organizations operate computer networks that interconnect a number of computing devices to support operations or to provide services to third parties. The computing devices can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

Data centers may provide data storage services configured to store data submitted by client devices, and enable retrieval of that data over a network. A variety of types of data storage services can be provided, often varying according to their input/output (I/O) mechanisms. For example, database services may allow I/O based on a database query language, such as the Structured Query Language (SQL). Block storage services may allow I/O based on modification to one or more defined-length blocks, in a manner similar to how an operating system interacts with local storage, and may thus facilitate virtualized disk drives usable, for example, to store an operating system of a virtual machine. Object storage services may allow I/O at the level of individual objects or resources, such as individual files, which may vary in content and length.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
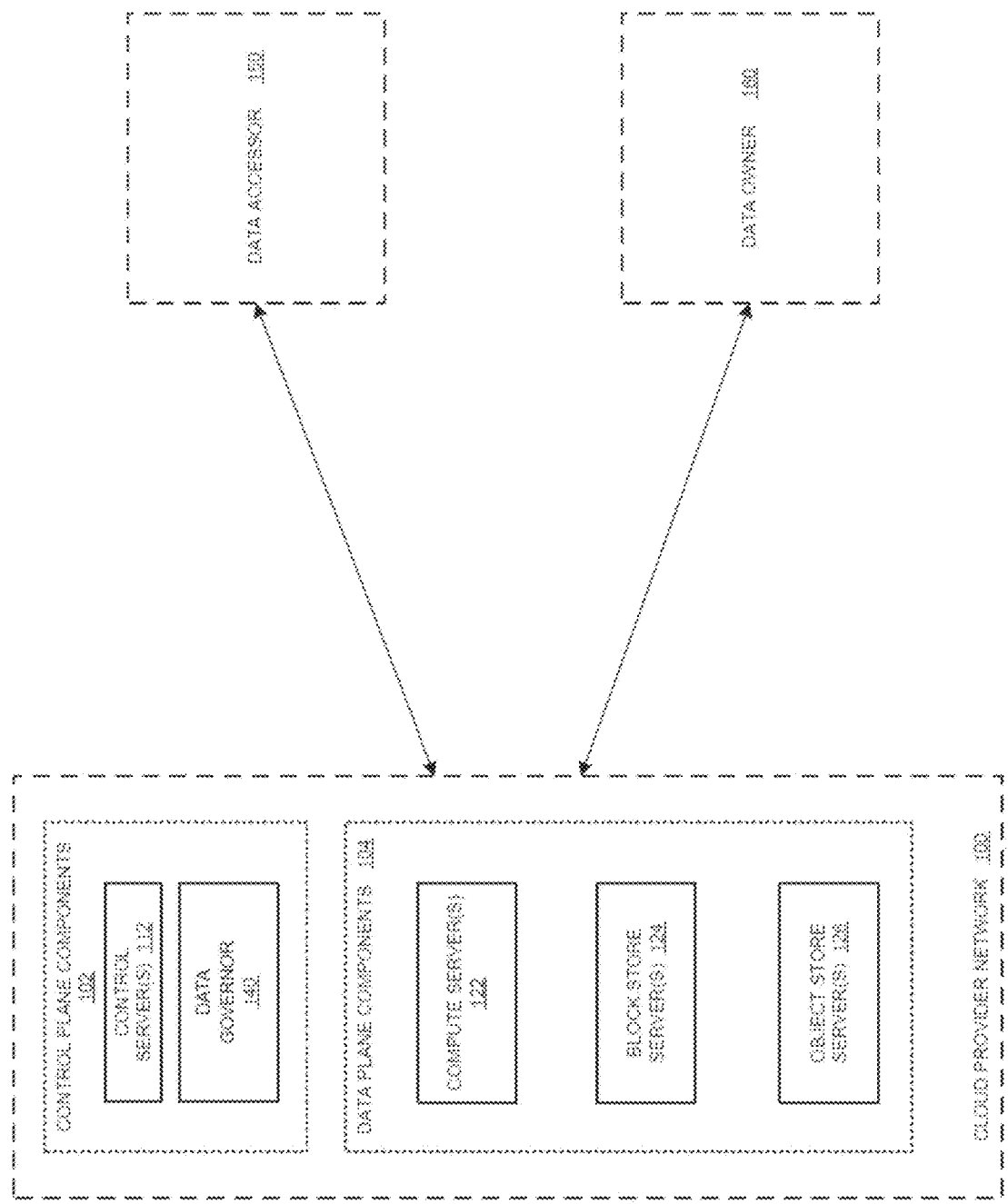
FIG. 1A is a block diagram depicting an illustrative environment in which a storage system and secure data access management system can operate according to some embodiments.

Generally described, the present disclosure relates to management of access to data by maintaining the lineage of metadata (e.g., "access metadata") assigned to the data. Beneficially, this enables datasets to be transformed and merged while retaining any access restrictions associated with portions of the original data, for example access restrictions relating to data privacy or data security concerns. In particular, the lineage of access metadata may be maintained as the corresponding data is queried, processed, and stored in a computing environment. For example, data stored within a computing environment may be tagged or otherwise associated with access metadata that represents an access categorization of the data (e.g., a categorization of the data as public, private, etc.). When the data is used as a basis from which to create a new data set, the access categorizations of the base data may be retained, and metadata representing an access categorization of the new data set may be generated based on the access categorizations of the base data. In addition, the new data set may be stored in a location according to the access categorization. This process may be repeated each time the base data or derived data sets are used to create new data sets. Thus, the metadata lineage of the base data is maintained, and access to derived data may be automatically managed in accordance with the access metadata of the base data.

Conventional storage systems allow data access to be managed based on storage location, user role, or the like. However, in some systems, as data is used as base data to generate new data sets, access to the new data sets may be set independently from the base data from which the data sets are derived, or no access control mechanism at all may be implemented. In such cases, the lineage of access control is lost, and private or otherwise restricted data may end up exposed outside of the secure storage location to which restricted data is assigned, or restricted data may otherwise be exposed to processes or users that lack the requisite degree of access for the base data.

Some aspects of the present disclosure address the issues noted above, among others, by tagging or otherwise associating data with metadata regarding access classifications, and then automatically propagating the access classifications to data generated from the tagged data. In some embodiments, a hierarchy of access classifications may be used. For example, a set of access classifications may be arranged in a hierarchy such that the lowest level of access may be assigned to the most accessible data (e.g., public), and progressively higher levels of access may be assigned to data that is to be less accessible, up to a highest level of access that is most restrictive (e.g., critical). Processes or users of the data (collectively referred to as "data accessors") may be assigned particular levels of access, and may access data at their respective assigned level of access and, in some cases, any level below their respective levels of access.

As the data is processed and further data sets are derived from prior data sets, the access categorizations are maintained, in some embodiments on an element-by-element basis. For example, a data source may include tabular data such as a table in which columns correspond to individual fields, and rows correspond to individual records composed of values for various fields. Access classifications may be applied to individual columns or subsets thereof. When data from a particular column is included in a data set, or data derived from a particular column is included in a data set, then the corresponding data in the new data set can inherit the same access classification as the source column(s). In a case where the new data set is composed of data items with different access classifications, the data set itself may be assigned the highest access classification of all data items included in the data set.

Additional aspects of the present disclosure relate to storing data in locations—whether physical or logical—based on the access classification assigned to the data. In some embodiments, a data provider (e.g., the source of data used in a process and/or included in a data set) may have a different storage location for each access classification. For example, if there are five different access classifications, then the data provider may have five different access classification-specific locations, also referred to as "buckets," in which data can be stored. When a data set is created and an access classification is assigned to the data set (e.g., the highest access classification of any data item included in the data set), then the data set may be stored in the bucket that corresponds to the access classification. A data accessor with the requisite level of access for the data provider can then access the data in the bucket, perform additional processing, etc. A data accessor without the requisite level of access for the data provider can be denied access to the data.

Further aspects of the present disclosure relate to managing changes to access categorizations applied to data items and data sets. In some embodiments, a change in an access categorization for a particular data item may trigger execution of a backfill process in which data sets that were previously generated using data associated with the prior access classification are moved from the location associated with the prior access classification to the location associated with the new access classification. For example, a particular data item may be associated with a low-level access classification (e.g., a level of 1 in a hierarchy that goes from 1-5, with 1 being least restrictive and 5 being most restrictive). The data item may be changed to be associated with a higher-level access classification (e.g., a level of 2). The next time a process is run to generate a data set using that data item, the new higher-level access classification may be automatically used, and may affect the access classification of the resulting data set that is produced. In this case, the new data set may automatically be stored in the location associated with the higher-level access classification. In addition, the previously-generated data sets stored in the location associated with the lower-level access classification may be moved to the location associated with the higher-level access classification due to the change in access classification for the data item.

In some embodiments, a change in an access categorization for a particular data item may not necessarily trigger execution of a backfill process, but may instead apply only to future data sets generated after the access categorization change, or only to data sets generated after a particular effective date. For example, a particular data item may be associated with a low-level access classification (e.g., a level of 1) and may be changed to be associated with a higher-level access classification (e.g., a level of 2). The change may be given a future effective date. Any process running on or after the effective date may use the new higher-level access classification, and the new data set may automatically be stored in the location associated with the higher-level access classification. Data sets generated prior to the effective date, including previously-generated data sets, may continue to be stored in the location associated with the lower-level access classification without being moved to the location associated with the higher-level access classification.

Additional aspects of the present disclosure relate to exposing access management features as a service and implementing storage operations based on requests, commands, and/or other interactions with the service. In some embodiments, requests may be submitted to delete a particular type of data, such as data associated with a particular access classification. For example, particular types of data may be assigned particular access classifications based on a data management framework such as the General Data Protection Regulation (GDPR), California Consumer Privacy Act (CCPA), export control regulations, or the like. A request may be submitted to delete a type of data associated with a particular data source, such as personally identifiable information (PII) of a particular user. During the course of the user's use of the storage system, an access classification may have been applied to the user's data that meets one or more criteria (e.g., a PII classification is applied to data that is personally-identifiable data as defined by an applicable framework). When the user subsequently submits a request to obtain or delete all such data, the relevant data may be identified by inspecting the access classification tag assigned to stored data. The data can then be deleted, provided to the user, reclassified, or the like depending upon the specifics of the request.

In some embodiments, data that qualifies as PII may be managed by a particular entity, and the definitions may change over time. When the definition of what qualifies as PII changes, access levels associated with data may be adjusted accordingly. For example, the entity may change the definition of what qualifies as PII to be more inclusive such that additional data items, not previously considered PII, are to be considered PII going forward. The changes may be updated using a management component of the storage system (e.g., a data governor), which may then adjust (automatically or on-demand) the access levels of those data items to a higher level for PII within an access level hierarchy. Subsequent data generation and storage procedures involving such data may be automatically adjusted based on the changed access level, as described in greater detail below.

Various aspects of the disclosure will now be described with regard to certain examples and embodiments, which are intended to illustrate but not limit the disclosure. Although aspects of some embodiments described in the disclosure will focus, for the purpose of illustration, on particular examples of storage systems, access classifications, data sets, and service operations, the examples are illustrative only and are not intended to be limiting. In some embodiments, the techniques described herein may be applied to additional or alternative storage systems, access classifications, data sets, service operations, and the like. For example, an access level hierarchy is used is various examples described herein. The access level hierarchy is described as including a particular quantity of access levels (e.g., five) where the lowest level (e.g., access level 1) is the least restrictive, the highest level (e.g., access level 5) is the most restrictive, and the remaining access levels fall sequentially between the lowest and highest levels and are associated with corresponding intermediate degrees of restrictiveness. However, this example access level hierarchy is illustrative only, and is not intended to be limiting, required, or exhaustive of the access levels that may be used. Some embodiments may have greater or fewer levels in the access level hierarchy. Some embodiments may not use a hierarchy of access levels, but may instead use access levels that at least partially overlap and/or differ in specific respects rather than overall degrees of restrictiveness.

Any feature used in any embodiment described herein may be used in any combination with any other feature, without limitation.

Overview of Example Computing Environment

With reference to an illustrative embodiment, FIG. 1A shows an example computing environment in which features of the present disclosure may be implemented. As shown, the computing environment includes a cloud provider network substrate 100 (also referred to herein as a "cloud provider network," "provider network," "cloud provider system", or simply as a "cloud" for convenience), any number of data accessor systems 150 (also referred to herein simply as "data accessors" for convenience) that access data at the cloud provider network 100 or otherwise interact with the cloud provider network 100 regarding data stored there, and any number of data owner systems 160 (also referred to herein simply as "data owners" for convenience) that maintain and/or modify access levels associated with data sets and/or individual data items stored by the cloud provider network 100. The cloud provider network 100, data accessors 150, and data owners 160 may communicate with each other via an intermediate network (not shown), such as the Internet.

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example allowing users to have at their disposal scalable "virtual computing devices" via their use of the compute servers 122 (which provide compute instances via the usage of one or both of CPUs and GPUs, optionally with local storage) and block store servers 124 (which provide virtualized persistent block storage for designated compute instances). These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface ("API") refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

A cloud provider network 100 can be formed as a number of regions, where a region is a separate geographical area in which the cloud provider clusters data centers. Each region can include two or more availability zones connected to one another via a private high-speed network, for example a fiber communication connection. An availability zone refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Customers can connect to availability zones of the cloud provider network via a publicly accessible network (e.g., the Internet, a cellular communication network). Transit Centers ("TC") are the primary backbone locations linking customers to the cloud provider network, and may be co-located at other network provider facilities (e.g., Internet service providers, telecommunications providers). Each region can operate two TCs for redundancy.

The cloud provider network 100 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators ("NATs"), and so on, as well as the physical connections among the devices. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block store server 124, an object store server 126, a control server 112) can have an IP address in the substrate network. Hardware virtualization technology can enable multiple operating systems to run concurrently on a host computer, for example as virtual machines ("VMs") on a compute server. A hypervisor, or virtual machine monitor ("VMM"), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes customer resources that are implemented on the cloud provider network 100 (e.g., computing instances, containers, block storage volumes, databases, file storage, etc., as described in greater detail below). Data plane traffic generally includes non-administrative operations such as transferring data to and from the customer resources.

Certain control plane components 102 (e.g., tier one control plane components such as the control plane for a virtualized computing service) are typically implemented on a separate set of servers from the data plane components 104, while other control plane components 102 (e.g., tier two control plane components such as analytics services) may share virtualized servers with data plane components 104. Resources of the control plane can be provisioned in an account (or accounts) of the cloud provider, while resources of the data plane can be provisioned in respective user accounts.

In some embodiments, the control plane components 102 may include a management component or subsystem, such as a data governor 140, configured to implement aspects of the present disclosure for managing access levels associated with data items, as described in greater detail below. The data governor 140 may be implemented on a separate set of servers from the data plane components 104, or it may share one or more virtualized servers with data plane components 104. In some embodiments, certain modules or components of the data governor 140 may be part of the data plane such that they are data plane components 104. For example, components of the data governor 140 may be implemented as part of a block store server 124 or object store server 126 to facilitate certain access level management features described herein.

Control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more customers. These compute servers 122 can support a virtualized computing service of the cloud provider network 100. The cloud provider network 100 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units ("CPUs") or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane can also include one or more block store servers 124, which can include persistent storage for storing volumes of customer data as well as software for managing these volumes. These block store servers can support a managed block storage service of the cloud provider network 100. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers 126, which represent another type of storage within the cloud provider network 100. The object storage servers 126 include one or more servers on which data is stored as objects within resources referred to as buckets, and can be used to support a managed object storage service of the cloud provider network 100. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that can be used to restore volumes.

Some customers may desire to use the resources and services of the cloud provider network 100, but for various reasons (e.g., latency in communications with customer devices, legal compliance, security, or other reasons) prefer for these resources and services to be provisioned within their own network, for example on premises of the customer. A piece of the cloud provider network—referred to herein as a "provider substrate extension" or PSE—may be provisioned within the customer's network. A customer may access their PSE via the cloud provider network 100 or their own network, and may use the same APIs to create and manage resources in the PSE as they would use to create and manage resources in the cloud provider network 100 region.

The PSE may be pre-configured, e.g. by the provider network operator, with the appropriate combination of hardware with software and/or firmware elements to support various types of computing-related resources, and to do so in a manner that mirrors the experience of using the cloud provider network 100. For example, one or more PSE servers can be provisioned by the cloud provider within the customer network. As described above, the cloud provider network 100 may offer a set of predefined instance types, each having varying types and quantities of underlying hardware resources. Each instance type may also be offered in various sizes. In order to enable customers to continue using the same instance types and sizes in their PSE as they do in the cloud provider network 100 region, the PSE server can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server, meaning while other VMs are still running and consuming other capacity of the PSE server. This can improve utilization of resources within the PSE by allowing for better packing of running instances on physical hosts, and also provides a seamless experience regarding instance usage across the cloud provider network 100 region and PSE.

In the manner described above, a PSE forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity managed by the cloud provider but provided outside of a traditional availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a far zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

Example Computing Device to Manage Access to Data

Figure 1B:
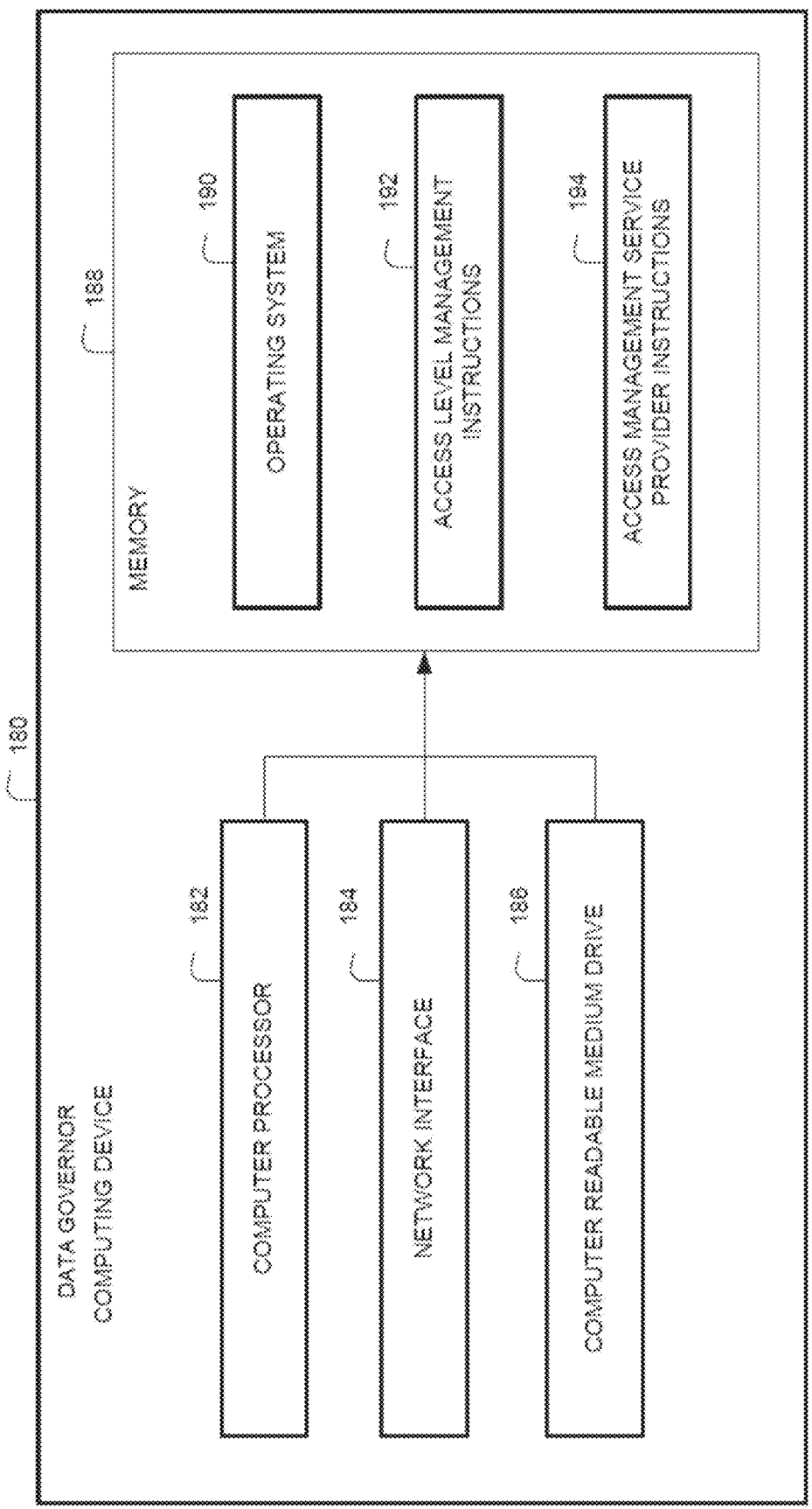
FIG. 1B is a block diagram of an illustrative computing device configured to implement features of secure data access management according to some embodiments

FIG. 1B illustrates various components of an example computing device 180 configured to implement various functionality of the data governor 140.

In some embodiments, as shown, the computing device 180 may include: one or more computer processors 182, such as physical central processing units ("CPUs"); one or more network interfaces 184, such as a network interface cards ("NICs"); one or more computer readable medium drives 186, such as a high density disk ("HDDs"), solid state drives ("SSDs"), flash drives, and/or other persistent non-transitory computer-readable media; and one or more computer readable memories 188, such as random access memory ("RAM") and/or other volatile non-transitory computer-readable media.

The computer readable memory 188 may include computer program instructions that one or more computer processors 182 execute in order to implement one or more embodiments. The computer readable memory 188 can store an operating system 190 that provides computer program instructions for use by the computer processor(s) 182 in the general administration and operation of the computing device 180.

In some embodiments, the computer readable memory 188 can further include computer program instructions and other information for implementing aspects of the present disclosure. For example, the computer-readable memory 188 may include access level management instructions 192 for managing the assignment of access levels to data during data processing tasks, responding to changes in access levels, and the like as described herein. As another example, the computer-readable memory 188 may include access management service provider instructions 194 for facilitating use of access management features by data accessors, data owners, and other users of the cloud provider network 100.

When a routine is initiated, a corresponding set of executable program instructions stored on a computer readable medium drive 186 may be loaded into computer readable memory 190 and executed by one or more computer processors 182. In some embodiments, a routine—or portions thereof—may be implemented on multiple computing devices and/or multiple processors, serially or in parallel.

Dynamic Storage Volume Configuration in the Example Computing Environment

Figure 2:
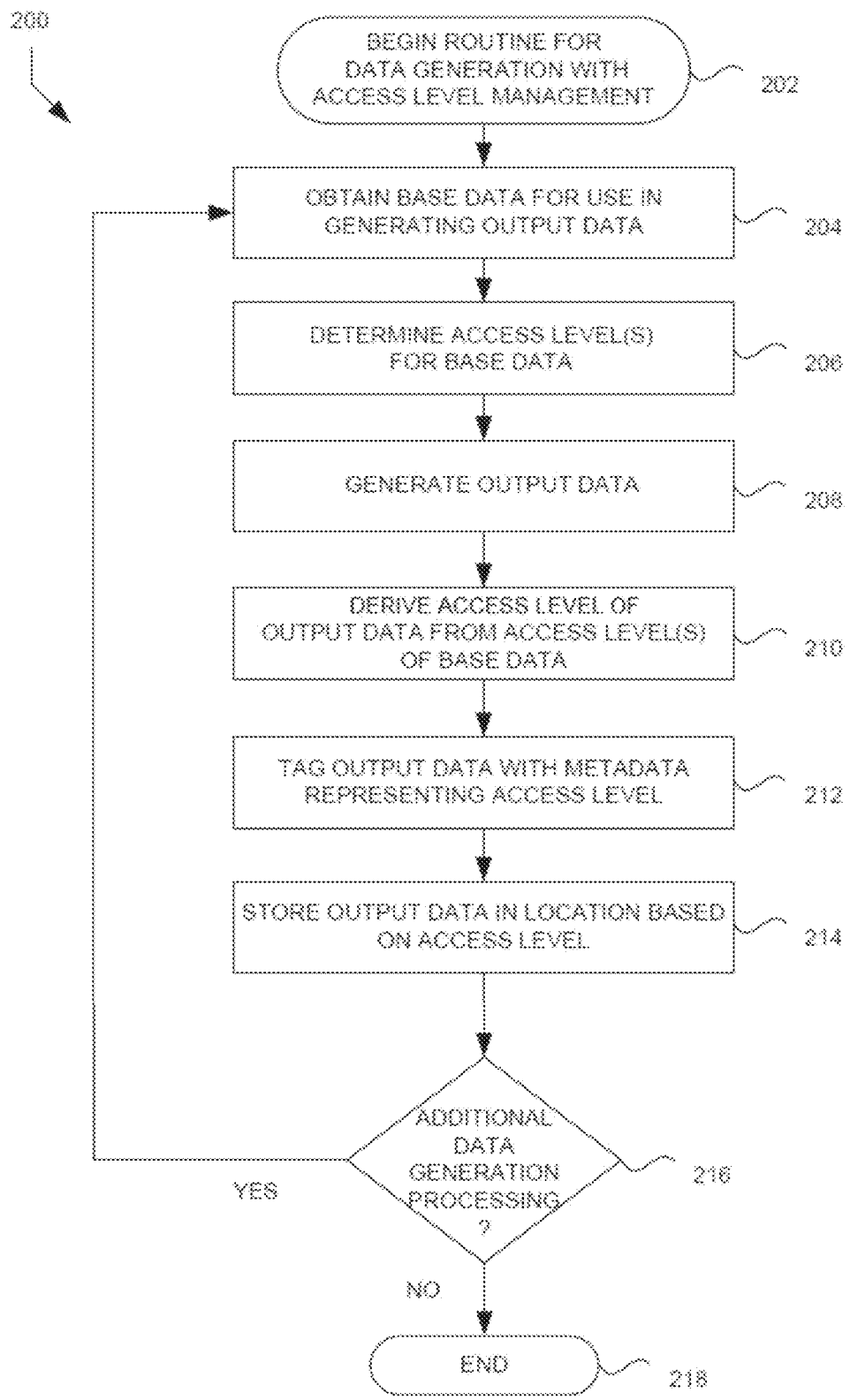
FIG. 2 is a block diagram of illustrative data flows and interactions of components of a storage system to retain the lineage of metadata regarding access management according to some embodiments.

FIG. 2 is a flow diagram of an example routine 200 for managing access classifications (also referred to as "access levels" in some embodiments) associated with data. Advantageously, access levels may be managed as data is used during a data generation routine to generate new data sets, thereby ensuring the lineage of access levels associated with base data sets and data items is maintained as those base data sets and data items are used in various processes. In some embodiments, the access levels associated with individual data sets or data items are represented by access metadata with which the corresponding data is tagged or otherwise associated. The routine 200 will be described with further reference to the example data flows and interactions shown in FIGS. 3A, 3B, 4, 5, and 6.

The routine 200 beings at block 202. In some embodiments, routine 200 may begin in response to an event, such as initiation of a data generation routine in which base data sets and data items (collectively "base data") are used as the basis to perform various analyses, derive various data items, generate output data sets, or the like.

At block 204, the data governor 140 or some other module or component may obtain base data to be used in the data generation routine. In some embodiments, the base data may be obtained from one or more data plane components 104 of the cloud provider network 100, such as one or more object store servers 126.

Figure 3A:
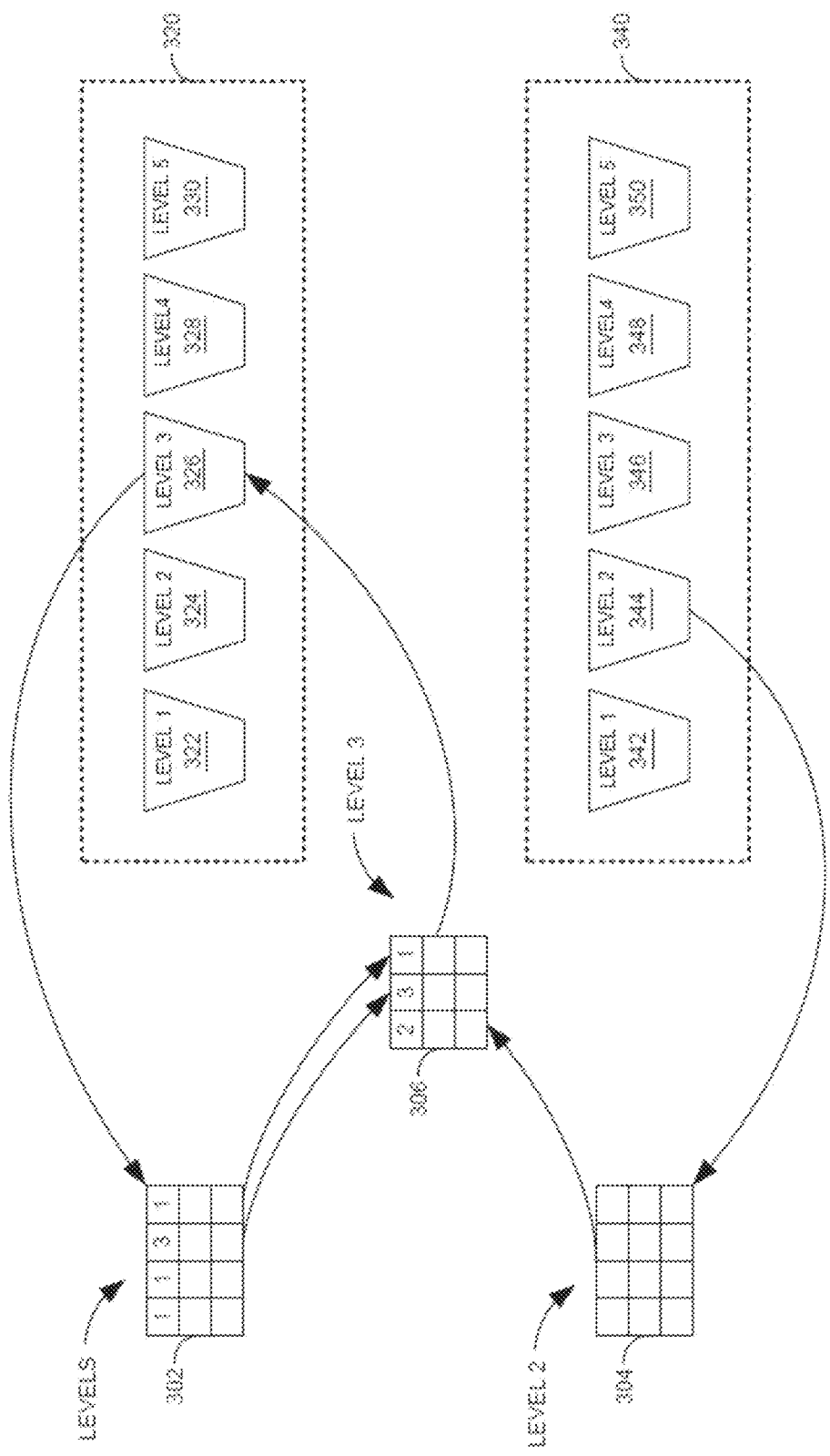
FIGS. 3A and 3B are block diagrams of illustrative data flows and interactions of components of a storage system to retain the lineage of metadata regarding access management according to some embodiments.

With reference to an illustrative embodiment, FIG. 3A shows data set 302 being obtained from a set of provider data stores 320 which may correspond to physical storage on one or more object store servers 126. Data set 304 is being obtained from a different set of provider data stores 340, which may correspond to physical storage on the same or a different set of one or more object store servers 126. The provider data stores 320 may be associated with one data provider (e.g., one data owner 160), while provider data stores 340 may be associated with a different data provider (e.g., a different data owner 160). The current iteration of routine 200 may be executed to generate an output data set 306 from portions of data sets 302 and 304.

In some cases, a base data set may be associated with an access level that applies to the entire data set. The access level may correspond to a level of an access hierarchy that includes a lowest level, a highest level, and any number of intermediate levels. The lowest level may correspond to a least restrictive level of access (e.g., public data), and the highest access level may correspond to a most restrictive level of access (e.g., critical data). In the illustrated example, data set 304 is associated with access level 2 of a hierarchy that spans from 1 to 5, where 1 is the least restrictive access level and 5 is the most restrictive access level.

In some cases, a given data set may be associated with multiple access levels that apply to portions of the data set. For example, data set 302 may be a table in which columns correspond to individual fields, and rows correspond to individual records composed of values for various fields. Access classifications may be applied to individual columns or subsets thereof. As shown, some columns are associated with access level 1, while one column is associated with access level 3.

In some embodiments, the particular manner in which the access levels are associated with data sets, or portions thereof, may be a metadata tag. For example, data set 304 may be stored with metadata indicating the data set is assigned access level 2. As another example, data set 302 may be stored with metadata that maps individual columns of the data set to their assigned access levels.

The particular data stores in which each data set is stored and from which each data set is obtained may be based on the access level of the data set. For example, a set of provider data stores 340 for the provider of data set 304 may be a set of buckets, where each bucket corresponds to a different access level of the access level hierarchy. In the illustrated example, bucket 342 is a level 1 data store, bucket 344 is a level 2 data store, bucket 346 is a level 3 data store, bucket 348 is a level 4 data store, and bucket 350 is a level 5 data store. The access level assigned to a data set of a data provider controls the provider data store in which the data set is stored. In the illustrated example, data set 304 is stored in bucket 344 due to the assignment of data set 304 to access level 2.

As another example, a set of provider data stores 320 for the provider of data set 302 may include a separate set of provider-specific buckets, where each bucket corresponds to a different access level of the access level hierarchy. In the illustrated example, bucket 322 is a level 1 data store, bucket 324 is a level 2 data store, bucket 326 is a level 3 data store, bucket 328 is a level 4 data store, and bucket 330 is a level 5 data store. Data set 302 may be associated with a plurality of different access levels, due to the column-specific access levels that may differ from each other within the same data set. In such cases, the access level that controls the provider data store in which the data set is stored may be the highest or otherwise most restrictive access level. In the illustrated example, the most restrictive access level is level 3, and therefore data set 302 is stored in bucket 326. However, metadata regarding the access levels of individual columns of the data set 302 may be stored in connection with data set 302.

At block 206, the data governor 140 or some other module or component may determine an access classification for each base data item being used in the data generation routine. The base data items being used in the data generation routine may include each item of base data that is included in the output data that is generated. In some embodiments, the data items used in the data generation routine and considered in the current iteration of routine 200 may not necessarily be limited to items of base data that are actually included in the output data set, but may also include base data items that are analyzed, considered, or otherwise used in generating the output data set. For example, each base data item that is used to calculate or derive an analysis metric that is included in the output data may be identified. The access classifications for each such data item may be determined.

At block 208, the data governor 140 or some other module or component may generate output data using the base data obtained in block 204 above. The manner and/or degree to which the base data is used to generate the output data may vary, depending upon the specifics of the data generation process being performed. For example, the output data may be a composite of existing data sets or portions thereof. As another example, the output data may be derived (e.g., computed from) existing data sets or portions thereof. As a further example, the output data may be the result of an analysis of existing data sets or portions thereof.

FIG. 3A illustrates generation of output data set 306 from base data sets 302 and 304. In particular, data set 306 is a composite or other derivation of data sets 302 and 304, including subsets of columns of data sets 302 and 304. As shown, two columns are included from data set 302, and one column is included from data set 304.

In the example shown in FIG. 3A, output data set 306 includes two columns from data set 302, including one column with an access level of 1, and another column with an access level of 3. One column is included from data set 304, which is assigned an access level of 2 due the assignment of access level 2 to the entirety of the data set.

At block 210, the data governor 140 or some other module or component can determine an access level or other access classification for the output data set. The access classification may be determined based on the access levels of the base data sets and/or individual data items thereof used to generate the output data set. When different classifications have been assigned to base data sets and data items used in generating the output data set, the data governor 140 may apply a rule to determine the access classification to be assigned to the output data set. In some embodiments, the rule may specify that the highest access classification of all base data sets and/or data items used to generate the output data set is to be assigned to the output data set.

In the example shown in FIG. 3A, one of the columns from data set 304 has an access classification of access level 3, which is the highest out of any data item used to generate output data set 306. Thus, access level 3 is assigned as the access classification for output data asset 306.

At block 212, the data governor 140 or some other module or component may associate an access classification with the output data set. Associating an access classification with the output data set may involve generating access metadata with which the output data set is to be tagged. For example, the access metadata may indicate the identifier of the access classification.

At block 214, the data governor 140 or some other module or component may store the output data set in a location based on the access classification assigned to the output data set. In some embodiments, the output data set may be stored in a data store of the data provider associated with the base data item or data set having the controlling access classification for the output data set. For example, each data provider may have multiple data stores (e.g., buckets) in the cloud provider network 100, and each provider-specific data store may be associated with a different access level of an access level hierarchy. The data store that is associated with the access level hierarchy assigned to the output data set may be selected as the data store into which the output data set is to be stored.

In the example shown in FIG. 3A, the output data set 306 may be stored in bucket 326, an access level 3 data store, due to access classification of a data item of data set 302 being the controlling access classification (e.g., the highest access classification of all data items used to generate output data set 306).

At decision block 216, the data governor 140 or some other module or component may determine whether there are additional data generation processes to be performed, such as subsequent data generation processes to be triggered after creation of the output data set, or other data generation processes that have been requested, queued, or the like. If so, the routine 200 may return to block 204. Otherwise, the routine may terminate at block 218.

Figure 3B:
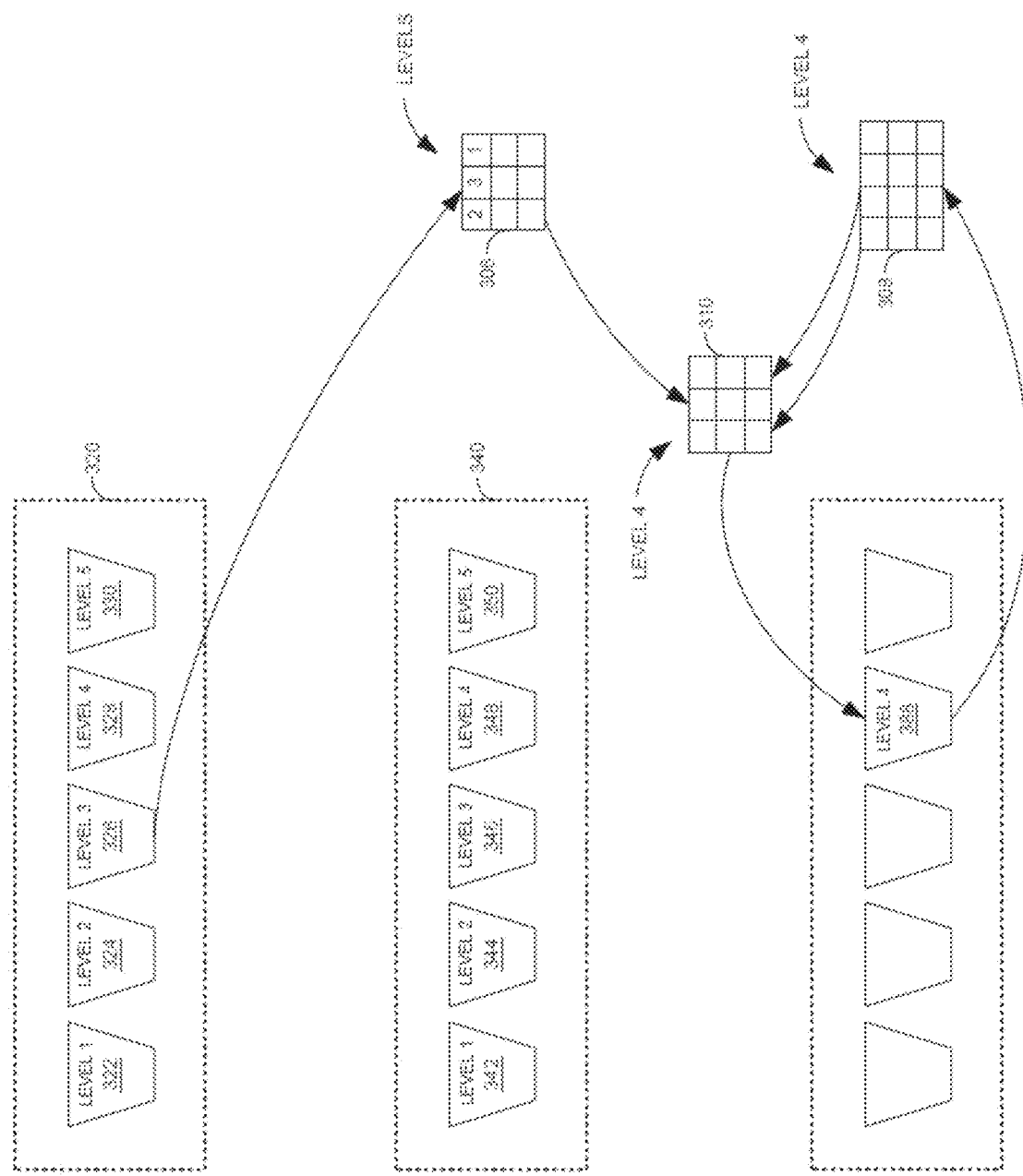

In the example shown in FIG. 3B, an additional data generation process is performed using the output data set 306. Illustratively, the additional output generation process involves returning to block 204 of routine 200 to obtain base data to be used in the additional data generation process: data set 306 and another data set, data set 308. Data set 306 is obtained from bucket 326, which is the access level 3 data store of a particular provider. Data set 308 is obtained from bucket 388, which is the access level 4 data store of a different provider.

A new output data set 310 is generated using data sets 306 and 308 (or portions thereof). For example, data set 308 as a whole may be associated with access level 4, and any data set generated using data set 308 may therefore be assigned access level 4. Thus, when output data set 310 is generated using data from data set 308, output data set 310 may be assigned access level 4. Accordingly, output data set 310 may be stored in bucket 388, which is the access level 4 data store of the provider of data set 308.

Figure 4:
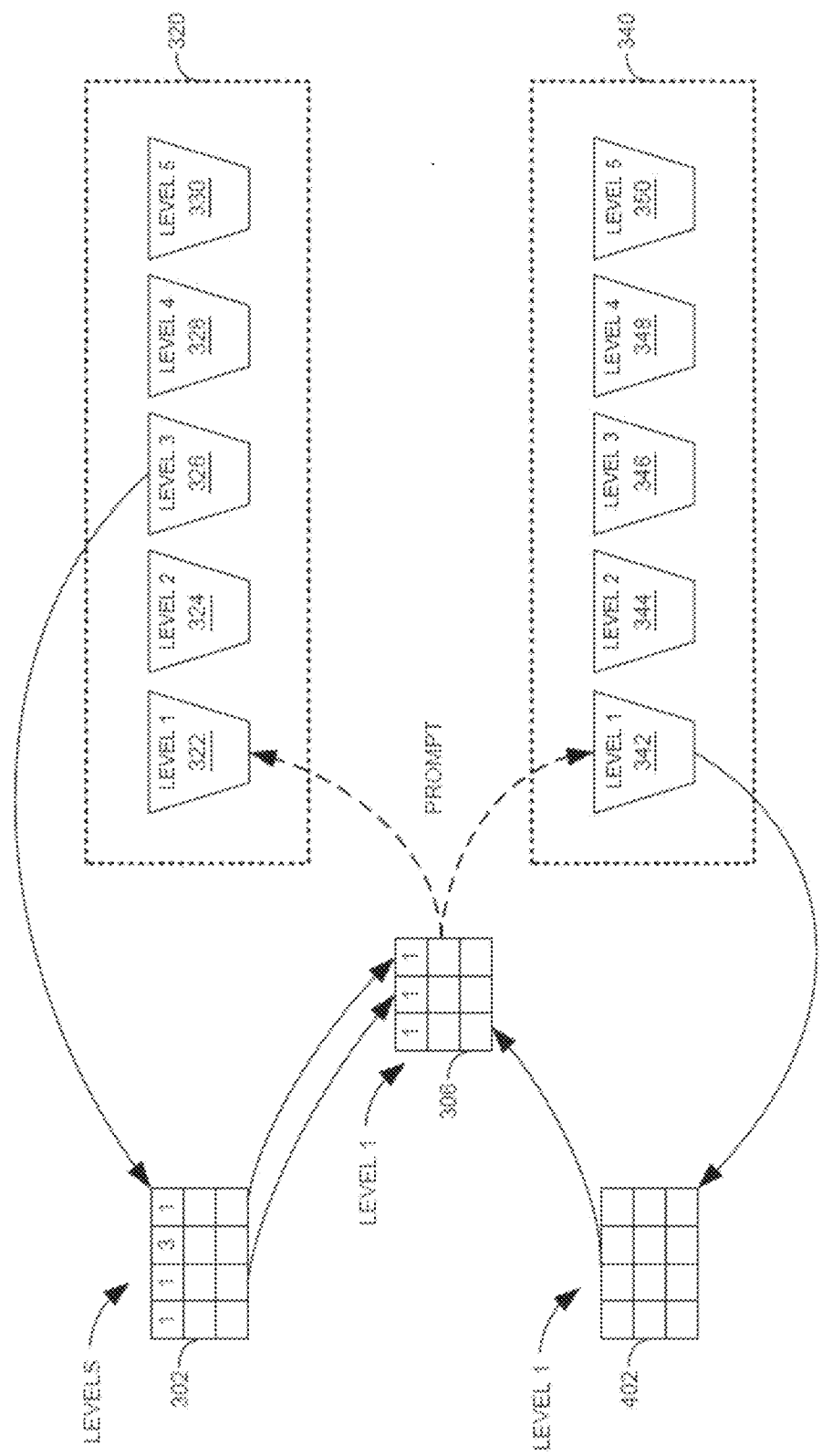
FIG. 4 is a block diagram of illustrative data flows and interactions of components of a storage system to retain the lineage of metadata regarding access management according to some embodiments.

In some embodiments, a base data set is stored in a particular bucket based on the highest access level with which a data item in the data set is associated, but an output data set derived from the stored data set may be stored in a bucket that is lower access level data store. FIG. 4 illustrates an example in which data set 302 and data set 402 are used to generate output data set 404. As described above, access level 3 is assigned to data set 302 based on the highest access level of a data item in data set 302. Accordingly, data set 302 is stored in bucket 326, which is the access level 3 data store for the provider of data set 302. However, the only portions of data set 302 used to generate output data set 404 are data items associated with access level 1. In addition, data set 402 is assigned to access level 1. Thus, data set 404 is assigned access level 1 due to that being the highest access level of any data used to generate data set 404.

The data governor 140 may make a decision as to the particular bucket in which to store output data set 400: bucket 322, which is the access level 1 data store of the provider of data set 302, or bucket 342, which is the access level 1 data store of the provider of data set 402. The decision may be made based on automated selection criterion, such as predetermined or dynamically determined configuration. In some embodiments, the first time the data generation process illustrated in FIG. 4 is executed, a prompt may be provided for selection or other indication of the proper bucket in which to store the output data set 404. For example, the prompt may be provided to the initiator of the data generation process, to the provider of data set 302, to the provider of data set 402, or to some combination thereof. The options presented may include bucket 322 and bucket 342. In embodiments in which the initiator of the data generation process is presented with the prompt and is not one of the data providers, an additional or alternative bucket associated with the initiator may be provided as an option. Based on the response(s) to the prompt, the data may be stored in one or more selected locations. In some embodiments, data regarding the determination may be stored so that it is automatically implemented during future executions of the same data generation process.

Management of Changes to Access Levels

Access levels assigned to data sets and/or individual data items may not necessarily be static or permanent. In some embodiments, the access level assigned to a data set or data item may be changed (e.g., by the provider of the data set, by a system administrator, etc.). For example, a data provider may interactively manage the access levels assigned to their data, either on demand or on a schedule. As another example, external events may trigger changes to access levels (e.g., based on changes in data privacy requirements). When the access level assigned to a data set or individual data item is changed, the metadata that associates the data set/data item with an access level may be updated or replaced. In some cases, after the access level of a data set/data item has changed, it may no longer be stored in the proper bucket based on prior access-level-based storage determinations. To address this scenario, a backfill process may be triggered in some embodiments to move data sets to different buckets after access levels have been changed. The backfill process may be initiated automatically in response to the change to the access level of a data set, or it may be triggered when the changed access level is detected during a subsequent data generation process that involves the data set/data item with the changed access level.

Figure 5:
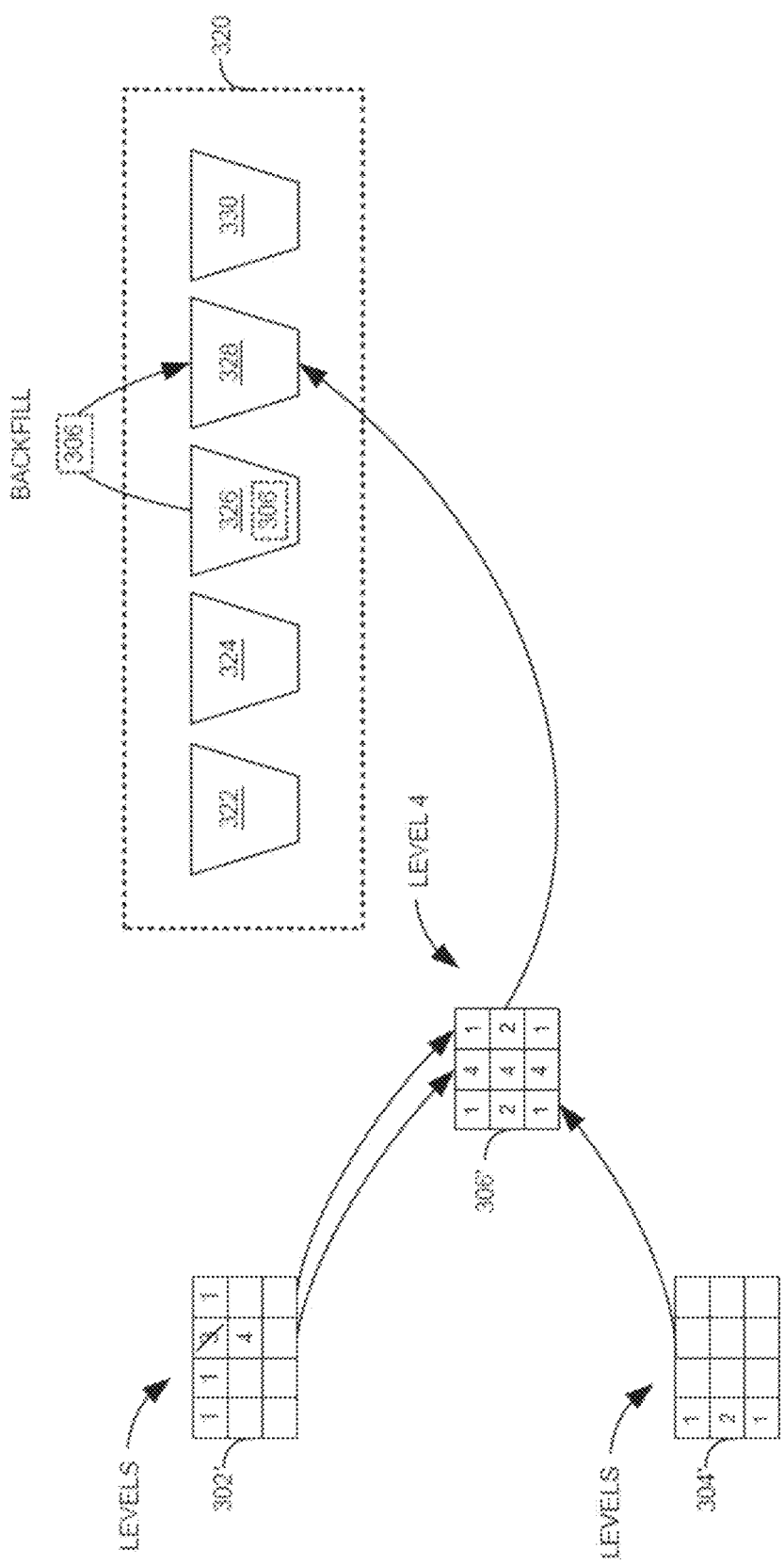
FIG. 5 is a block diagram of illustrative data flows and interactions of components of a storage system to retain the lineage of metadata regarding access management according to some embodiments.

FIG. 5 illustrates data flows and operations that may occur when the data governor 140 or some other module or component manages changes to access levels that have been assigned to data sets or individual data items. As described above, data set 302 includes a number of individual data items associated with various access levels, the greatest of which is access level 3. As illustrated in FIG. 5, the data item assigned to access level 3 may at some time be assigned to a different access level, such as access level 4. When the example data generation process described above is subsequently executed, the process may be based on data set 302', which includes the data item that has been changed to access level 4. The output data set 306' includes the data item that has been reassigned to access level 4. Thus, when a determination is made regarding the bucket in which to store the output data set 306', the data governor 140 determines that the data set 306' is to be stored in bucket 328, which is the access level 4 data store for the provider of data set 302'.

In some embodiments, data access levels may also or alternatively be assigned to rows of tabular data. For example, individual records of a table may be assigned different access levels than other records within the same table. Illustratively, this may be done to manage data associated with different data owners or data accessors.

As shown in FIG. 5, data set 304' has different access levels associated with different rows, rather than being a data set wholly associated with a single access level as described above with respect to data set 304. The second row of data set 304' is associated with access level 2, while the first and third rows are associated with access level 1. Thus, this data set would be stored in the level 2 data store of the data provider, assuming the data set was not drawn from a larger data set with data items assigned to higher access levels. When a data set that has different access levels for different rows is used with another such data set to generate output data, the row with the highest access level in the output data set may be the controlling access level for the data set, as with column-wise access levels described above.

In some embodiments, as shown in FIG. 5, a data set with rows having differing access levels—data set 304'—may be used with a data set that has columns with differing access levels—data set 302'—to generate an output data set. In this case, each individual field of the resulting data set may be assigned the highest access level of the data items (rows/columns) from which it is derived. As shown, the fields that correspond to the first and third columns of the second row of output data set 306' may be assigned an access level of 2 based on the access level of the record from base data set 304', while other fields in the first and third columns of output data set 306' are assigned an access level of 1 due to being derived from data items in both base data sets 302' and 304' having an access level of 1.

In addition to storing output data set 306' in bucket 328, a backfill process may be initiated. During the backfill process, previously-generated output data set 306, which was generated and stored in bucket 326 as described above, is moved to bucket 328 due to the re-classification of the data item in data set 302. In some embodiments, to facilitate the identification of data sets to be moved during the backfill process, metadata for an output data set may indicate the base data set and/or base data item from which individual data items of the output data set are generated and/or from which the output data set as a whole is generated. In this way, the data governor 140 can trace not only the lineage of access classifications, but also the linage of base data. For example, the data governor 140 can inspect metadata associated with a data set, determine that it includes a data item that has been assigned to a different access level, determine the identity and/or location of the data set to which the data item belongs, move the data set, and trace use of the data item back to a prior output data set of a chain of data generation processes to perform the same analysis, as needed, back to the original source data item or data set.

In some embodiments, when an access level assigned to a data set or individual data item is changed, the change may be associated with an effective date at which the change is to take effect. The effective date may correspond to a particular date, or a particular time, or a combination thereof. For example, the effective date may be specified and/or stored as a number that corresponds to a quantity of time units from a reference point in time. Prior to the effective date, the previously-assigned access level remains assigned to the data. At the effective date, the access level is updated to the new access level. For example, the access metadata associated with data is changed or replaced.

Data sets generated on or after the effective date may be generated based on the changed access level (e.g., access level assignments and storage locations for output data sets may be determined using the changed access level). However, rather than performing a backfill process for output data sets previously generated using the data item with the prior access level assignment, the previously-generated data sets may remain in their storage locations.

Figure 6:
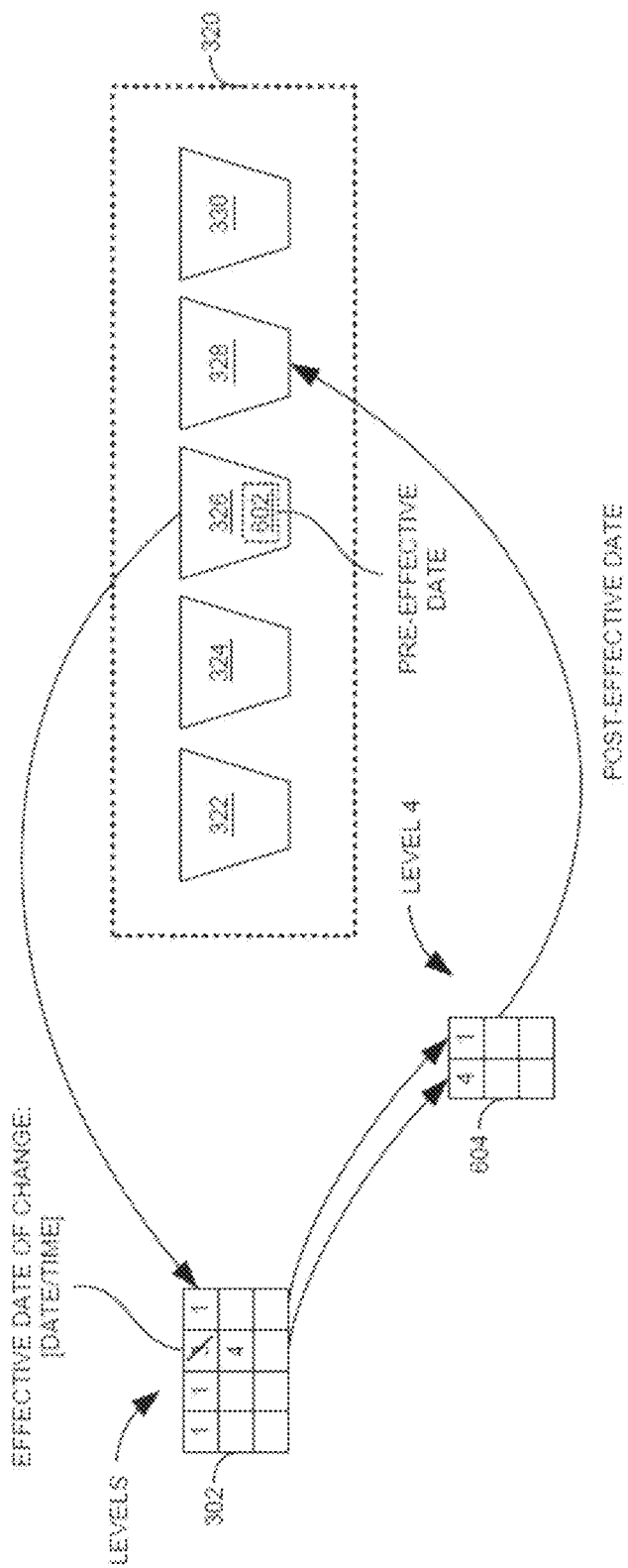
FIG. 6 is a block diagram of illustrative data flows and interactions of components of a storage system to retain the lineage of metadata regarding access management according to some embodiments.

FIG. 6 illustrates data flows and operations that may occur when the data governor 140 or some other module or component manages changes to access levels in connection with effective dates. As described above, data set 302 includes a number of individual data items associated with various access levels, the greatest of which is access level 3. As illustrated, the data item assigned to access level 3 may at some time be assigned to a different access level, such as access level 4. The change may be associated with an effective date. When output data set 604 is generated as a filtered set or other subset of data items of data set 302 after the effective date, the output data set 604 may include the data item that has been reassigned to access level 4. Thus, when a determination is made regarding the bucket in which to store the output data set 604, the data governor 140 determines that the data set 604 is to be stored in bucket 328, which is the access level 4 data store for the provider of data set 302. Data set 602, which was generated and stored in bucket 326 prior to the effective date, may remain in the bucket 326 and therefore may remain accessible to data accessors with a corresponding level of access.

Example Service Interface

Figure 7:
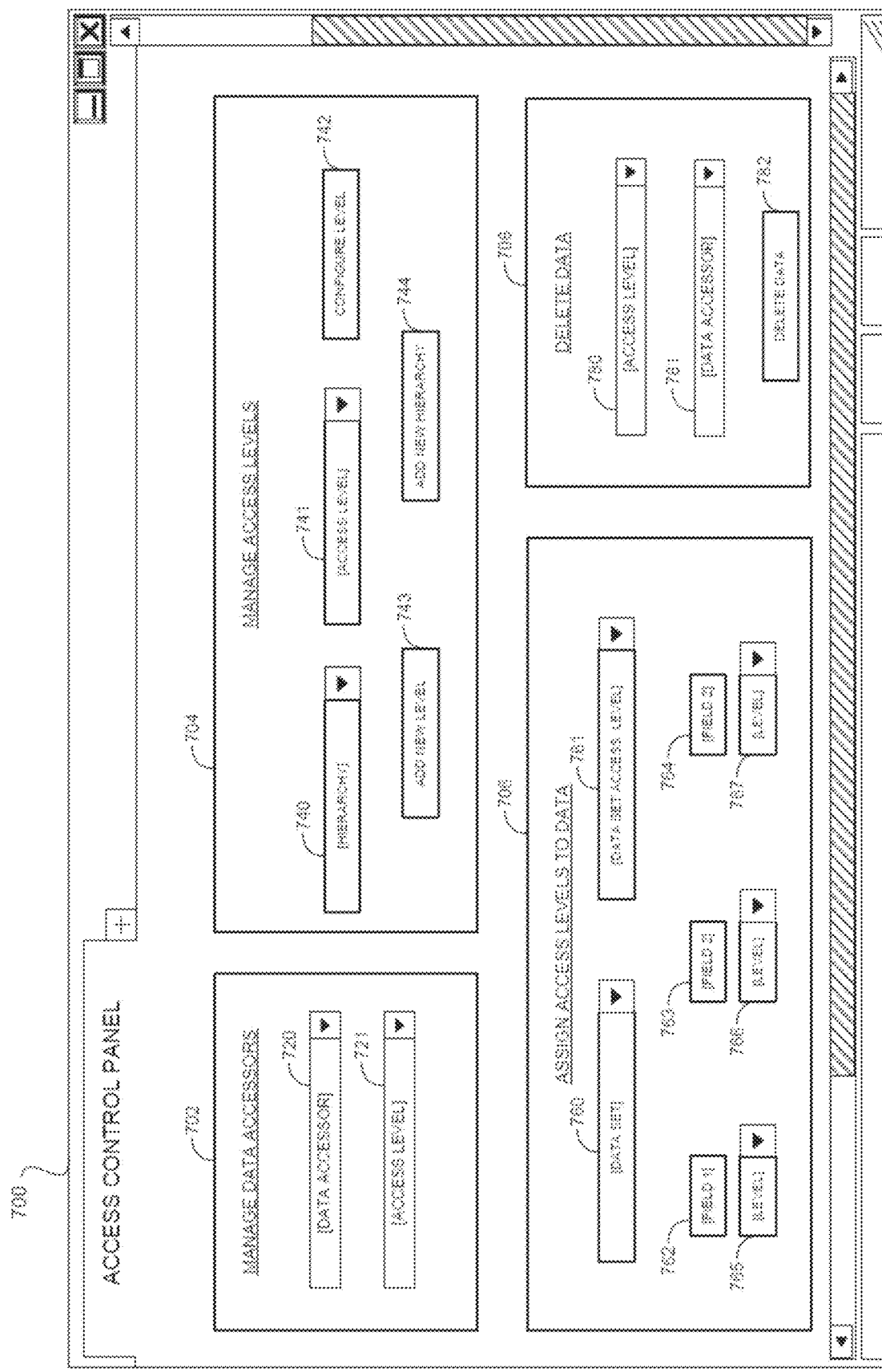
FIG. 7 depicts a user interface for secure data access management according to some embodiments.

FIG. 7 illustrates a user interface 700 that may be used to manage various aspects of data access classification. In some embodiments, aspects of data access management described herein may be exposed as a service that may be managed using the user interface 700. For example, a data provider or other data owner may define an access level hierarchy for use in managing data of the data owner stored at the cloud provider network 100. As another example, the data owner may manage the access levels of data permitted to be accessed by particular data accessors. As a further example, a data owner may manage the assignment of access levels to data sets and/or data fields, delete data associated with particular access levels, and the like.

In some embodiments, the user interface 700 may be generated by a component of the cloud provider system 100 (e.g., the data governor 140 or some other module or component) and presented to a data provider or other data owner via a data owner system 160. For example, the user interface 700 may be generated as a markup language interface (e.g., using Hypertext Markup Language "HTML") and presented via a browser application of a data owner system 160. As another example, the user interface 700 may be generated and presented via application software executing on the data owner system 160 using data received from the data governor 140.

In some embodiments, the user interface 700 may include a data accessor management portion 702 for managing the access levels of data permitted to be accessed by particular data accessors. For example, the data accessor management portion 702 may include a data accessor selection control 720 for selecting a particular data accessor, and an access level selection control 721 for selecting a corresponding access level for the selected data accessor.

In some embodiments, the user interface 700 may include an access level management portion 704 for defining and/or otherwise managing access level hierarchies that may be used for data sets of the data owner. For example, the access level management portion 704 may include a hierarchy selection control 740 for selecting an access hierarchy to manage, an access level selection control 741 for selecting an access level to manage, a configure level control 742 to launch another user interface for configuring the specific permissions and/or restrictions of the selected access level, an add access level control 743 for adding an access level to an access level hierarchy, and/or an add hierarchy control 744 for adding a new access level hierarchy.

In some embodiments, the user interface 700 may include a data access level management portion 706 for managing access levels of data sets of the data owner. For example, the data access level management portion 706 may include a data set selection control 760 for selecting a data set to manage, a data set access level selection control 761 for assigning an access level for the data set, various field selection controls 762, 763, 764 that indicate the columns or other fields of a selected data set, and field access level selection controls 765, 766, 767 for assigning access levels to individual fields.

In some embodiments, the user interface 700 may include a data deletion portion 708 for initiating deletion of data associated with particular access levels (e.g., in response to requests associated with privacy frameworks such as the GDPR or CCPA). For example, the data deletion portion 708 may include an access level selection control 780 for selecting an access level of data to delete, a data accessor selection control 781 (and/or a data owner selection control) for selecting data of a particular data accessor (and/or data owner) to be deleted, and a delete data control 782 for initiating deletion of the data associated with the selected access level (e.g., PII data) and, optionally, the selected data accessor (and/or data owner).

The example user interface portions, controls, and operations shown and described herein are illustrative only, and are not intended to be limiting, required, or exhaustive of the portions, controls, and operations that may be implemented for a user interface.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   under control of a computing system comprising memory and one or more computer processors configured to execute specific instructions:
   generating an output data set using a first data item from a first base data set and a second data item from a second base data set, wherein the first data item is associated with a first access level of a plurality of access levels, and wherein the second data item is associated with a second access level of the plurality of access levels;
   determining, based at least partly on the second access level being a higher level within an access level hierarchy than the first access level, to associate the second access level with the output data set; and
   generating access metadata for the output data set, wherein the access metadata represents an association of the second access level to the output data set, and wherein access to the output data set is limited to data accessors associated with the second access level or a higher access level of the access level hierarchy.

2. The computer-implemented method of claim 1, further comprising:
   receiving, from a data accessor, a request to access at least a portion of the output data set, wherein the data accessor is associated with the first access level; and
   denying the request based on the data accessor being associated with a lower access level within the access level hierarchy than the output data set.

3. The computer-implemented method of claim 1, further comprising:
   evaluating second access metadata associated with the second data item, wherein the second data item is stored with the second access metadata; and
   determining that the second data item is associated with the second access level based at least partly on the second access metadata.

4. The computer-implemented method of claim 1, further comprising storing the output data set in a storage location associated with the second access level, wherein access to the output data set in the storage location is restricted to data accessors associated with at least the second access level.

5. The computer-implemented method of claim 1, further comprising obtaining the first data item from a table, wherein the first data item comprises a value of a first field of a record in the table, wherein the first data item is associated with the first access level based on an association of the first field with the first access level, wherein a second field of the table is associated with a third access level of the access level hierarchy, and wherein the third access level is different from the first access level and the second access level.

6. The computer-implemented method of claim 1, further comprising obtaining the first data item from a table, wherein the first data item comprises a value of a first record in the table, wherein the first data item is associated with the first access level based on an association of the first record with the first access level, wherein a second record of the table is associated with a third access level of the access level hierarchy, and wherein the third access level is different from the first access level and the second access level.

7. The computer-implemented method of claim 1, further comprising:
   determining that the second data item has changed from being associated with the second access level to being associated with a third access level of the access level hierarchy;
   generating a second output data set using the first data item the second data item;
   associating the third access level with the second output data set based at least partly on the second data item being associated with the third access level;
   storing the second output data set in a storage location associated with the third access level;
   associating the third access level with the output data set; and
   moving the output data set from a storage location associated with the second access level to the storage location associated with the third access level.

8. The computer-implemented method of claim 1, further comprising:
   determining that the second data item is changed, as of an effective date, from being associated with the second access level to being associated with a third access level of the access level hierarchy;
   generating, after the effective date, a second output data set using the first data item the second data item;
   associating the third access level with the second output data set based at least partly on the second data item being associated with the third access level; and
   storing the second output data set in a storage location associated with the third access level, wherein the output data set remains associated with the second access level after the effective date.

9. The computer-implemented method of claim 1, further comprising:
   receiving a request to delete data associated with the second access level;

deleting the second data item based on the second data item being associated with the second access level; and deleting the output data set based on the output data set being associated with the second access level.

10. The computer-implemented method of claim 1, further comprising:

receiving input regarding a destination storage location for the output data set, wherein the output data set is generated based further on a third data item from a third base data set associated with a different data provider than the first base data set, and wherein the third data item is associated with the second access level; and storing the output data set in a storage location of a plurality of storage locations based at least partly on the input and the second access level.

11. A system comprising:

computer-readable memory storing executable instructions; and one or more computing devices programmed by the executable instructions to at least:

generate an output data set using a first data item from a first base data set and a second data item from a second base data set, wherein the first data item is associated with a first access level of a plurality of access levels, and wherein the second data item is associated with a second access level of the plurality of access levels;

determine, based at least partly on the second access level being a higher level within an access level hierarchy than the first access level, to associate the second access level with the output data set; and generate access metadata for the output data set, wherein the access metadata represents an association of the second access level to the output data set, and wherein access to the output data set is limited to data accessors associated with the second access level.

12. The system of claim 11, wherein the one or more computing devices are programmed by further executable instructions to:

receive, from a data accessor, a request to access at least a portion of the output data set, wherein the data accessor is associated with the first access level; and deny the request based on the data accessor being associated with a lower access level within the access level hierarchy than the output data set.

13. The system of claim 11, wherein the one or more computing devices are programmed by further executable instructions to store the output data set in a storage location associated with the second access level, wherein access to the output data set in the storage location is restricted to data accessors associated with at least the second access level.

14. The system of claim 11, wherein the one or more computing devices are programmed by further executable instructions to:

determine that the second data item has changed from being associated with the second access level to being associated with a third access level of the access level hierarchy;

generate a second output data set using the first data item the second data item;

associate the third access level with the second output data set based at least partly on the second data item being associated with the third access level;

store the second output data set in a storage location associated with the third access level;

associate the third access level with the output data set; and move the output data set from a storage location associated with the second access level to the storage location associated with the third access level.

15. The system of claim 11, wherein the one or more computing devices are programmed by further executable instructions to:

determine that the second data item is changed, as of an effective date, from being associated with the second access level to being associated with a third access level of the access level hierarchy;

generate, after the effective data, a second output data set using the first data item the second data item;

associate the third access level with the second output data set based at least partly on the second data item being associated with the third access level; and store the second output data set in a storage location associated with the third access level, wherein the output data set remains associated with the second access level after the effective date.

16. The system of claim 11, wherein the one or more computing devices are programmed by further executable instructions to:

receive a request to delete data associated with the second access level;

delete the second data item based on the second data item being associated with the second access level; and delete the output data set based on the output data set being associated with the second access level.

17. A data storage system comprising:

a data store comprising physical data storage media, wherein data stored on the physical data storage media is organized into a plurality of buckets associated with a data provider, wherein a first bucket of the plurality of buckets is associated with a first access level of an access level hierarchy, and wherein a second bucket of the plurality of buckets is associated with a second access level of the access level hierarchy; and a data governor comprising one or more computing devices, wherein the data governor is configured to at least:

generate a derived data set using a first data item from a first base data set and a second data item from a second base data set, wherein the first data item is associated with first access metadata representing an assignment of the first access level to the first data item, and wherein the second data item is associated with second access metadata representing an assignment of the second access level to the second data item;

determine, based at least partly on the second access level being a higher level within the access level hierarchy than the first access level, to assign the second access level to the derived data set;

generate third access metadata for the derived data set, wherein the third access metadata represents an assignment of the second access level to the derived data set; and store the derived data set in the second bucket based at least partly on the derived data set being assigned the second access level, wherein access to the derived data set is restricted to data accessors associated with at least the second access level.

18. The data storage system of claim 17, wherein the first data item comprises a value of a first field of a record in a table, wherein the first data item is associated with the first access level based on an association of the first field with the first access level, wherein a second field of the table is associated with a third access level of the access level hierarchy, and wherein the third access level is different from the first access level and the second access level.

19. The data storage system of claim 17, wherein the data governor is further configured to at least:
   determine that the second data item is associated with a third access level of the access level hierarchy subsequent to generating the third access metadata;
   generate a second derived data set using the first data item the second data item;
   assign the third access level to the second derived data set based at least partly on the second data item being assigned to the third access level;
   store the second derived data set in a third bucket of the plurality of buckets, wherein the third bucket is associated with the third access level; and
   move the derived data set from the second bucket to the third bucket.

20. The data storage system of claim 17, wherein the data governor is further configured to at least:
   receive a request to delete data associated with the second access level;
   delete the second data item based on the second data item being associated with the second access level; and
   delete the derived data set based on the derived data set being associated with the second access level.

* * * * *